Patented Aug. 26, 1930

1,773,724

UNITED STATES PATENT OFFICE

JAMES BARRET CROCKETT, OF CAMBRIDGE, MASSACHUSETTS, ASSIGNOR TO CAMBRIDGE RUBBER COMPANY, OF CAMBRIDGE, MASSACHUSETTS, A CORPORATION OF MASSACHUSETTS

PROCESS OF PRODUCING VARIATED SURFACE EFFECTS ON RUBBER ARTICLES

No Drawing. Application filed May 14, 1929. Serial No. 363,097.

This invention relates to a method of manufacturing a rubber article, one surface of which will have a two-color effect of novel and variated design. More specifically, it comprises a method of producing an article such as rubber shoes, bathing caps, gloves, sheet rubber, etc. by dipping a form in aqueous suspensions or dispersions of rubber of variated properties and colors and producing on one surface of the article or sheet a two-color effect. The invention also contemplates the article produced by the process.

The objects, briefly stated, are an improved and economical method of forming a rubber article by dipping or like operation, having two colors on one surface. Another object is to produce such article at a low cost by a sequence of dipping operations. Still another object is to produce an article of new and novel appearance having on one surface thereof a two-color design of variated effect.

The invention may be carried out by dipping an appropriate form in the shape of the article or sheet to be produced in an aqueous rubber containing compound which may be either a vulcanizable latex mix or a pre-vulcanized latex mix having a high proportion of a mineral filler. As an example, a mix consisting of dry rubber 30 parts as latex or vulcanized latex, zinc oxide 55 parts, chrometone yellow 10 parts, and other fillers protective colloids or vulcanizing ingredients 5 parts may be employed, or a mix consisting of 30 parts rubber as a dry rubber and 65 parts zinc oxide, and vulcanizing ingredients protective colloids or other fillers 5 parts. The form is dipped in such a highly compounded mix or the mix applied to the form by spraying, spreading or like manner and when evenly distributed over the form, the form is removed and dried at temperatures ranging from normal or slightly elevated up to 240° F., and due to the drying action and the action of heat the highly compounded rubber containing material will check and crack in a variated fashion over its entire surface. When the coat is dried and the desired effect obtained, the form is again dipped in a mix of contrasting color and a much lower percentage of filler to form a body or sheet of deposited rubber of required physical properties. When the body has been built up to the necessary thickness, it is dried and/or vulcanized and stripped from the form. In the case of a shoe, a sole can be attached or formed by dipping in a latex mix which may be of a contrasting color. A very novel appearance may be thus obtained, the character of which may be varied by the proportion of the filler in the first coat and by the temperature at which the first coat is dried. A suitable former would be any surface such as ordinarily employed in dipping forms, a plain surface of glass or metal is suitable for sheet rubber or in case it is desired to produce a shoe, a last of metal, wood, glass, porcelain or other like material.

The aqueous suspension of rubber employed may consist of a vulcanizable latex mix, i. e., rubber latex in natural, concentrated, purified, thickened or stabilized form or treated in any way desired, containing vulcanizing ingredients, and an accelerator or accelerators active at normal or at elevated temperatures. Such mixes may contain fillers, reinforcing matter, pigments and colors, to produce the required physical wearing and aging properties in the deposited rubber. After the article is formed by dipping in such a vulcanizable latex mix, vulcanization will of course be resorted to at a suitable stage of the process, preferably before stripping from the form, and may be effected at normal or elevated temperatures in dry heat, steam or hot water, or any of the known ways convenient. Alternatively, the article may be formed from a latex mix and vulcanized by the application of sulphur chloride.

The aqueous suspension of rubber may also consist of pre-vulcanized rubber latex such as obtained in following the procedure disclosed in U. S. Patents Nos. 1,443,149 dated January 23, 1923, and 1,682,857 dated September 4, 1928. Such pre-vulcanized latex compounded or not with fillers, pigments, dyes and like material is preferred in most instances on account of the ease and exactness of control of the degree of cure. It may be obtained in stabilized form in the most suitable concentration, viscosity, and degree of cure for forming the article desired. Handling and production are also facilitated by eliminating the step of vulcanization after the article is formed. The properties of the rubber deposited from such pre-vulcanized latex are of the highest order.

Aqueous dispersions of previously coagulated or reclaimed rubber artificially obtained by mechanical and/or chemical means may also be employed where their properties permit, and in either a vulcanized or unvulcanized condition.

The dipping, spraying or spreading operation may be carried out by hand or by mechanical means and details of forming, draining and drying are not further referred to as they will be well understood by those skilled in the art.

The surplus rubber around the top or edge of the article may be cut away either before or after removal from the form and suitable trimming may be applied. Articles having a very novel appearance may thus be obtained.

What I claim is:—

1. A rubber article which comprises a deposit of aqueous rubber containing material dried and cracked into a multiplicity of irregularly defined areas, combined with another deposit of aqueous rubber containing material which appears in the cracks and provides a variated surface.

2. A rubber article which comprises a deposit of aqueous rubber containing material containing a high proportion of mineral filler, the same being dried and cracked into a multiplicity of irregularly defined areas, combined with another deposit of aqueous rubber containing material which appears in the cracks and provides a variated surface.

3. A rubber article which comprises a deposit of aqueous rubber containing material containing a high proportion of mineral filler, the same being dried and cracked into a multiplicity of irregularly defined areas, combined with another deposit of aqueous rubber containing material of a different color which appears in the cracks and provides a variated parti-colored surface.

4. A rubber article which comprises a deposit of vulcanized latex dried and cracked into a multiplicity of irregularly defined areas, combined with another deposit of vulcanized latex which appears in the cracks and provides a variated surface.

5. A rubber article which comprises a deposit of vulcanized latex containing a high proportion of mineral filler, the same being dried and cracked into a multiplicity of irregularly defined areas, combined with another deposit of vulcanized latex which appears in the cracks and provides a variated surface.

6. A rubber article which comprises a deposit of aqueous rubber containing material containing a high proportion of zinc oxide, the same being dried and cracked into a multiplicity of irregularly defined areas, combined with another deposit of aqueous rubber containing material which appears in the cracks and provides a variated surface.

7. The process of producing a variated surface effect on a rubber article which consists in drying a deposit of aqueous rubber containing material until the same cracks into a multiplicity of defined areas, and depositing aqueous rubber containing material on the first said deposit and in the cracks.

8. The process of producing a variated surface effect on a rubber article which consists in drying a deposit of aqueous rubber containing material having an incorporated high percentage of mineral filler, until a multiplicity of irregular checks or cracks occur on the deposit, and depositing aqueous rubber containing material on the first said deposit.

9. The process of producing a variated surface effect on a rubber article which consists in drying a deposit of vulcanized rubber latex having an incorporated high percentage of mineral filler, until a multiplicity of irregular checks or cracks occur on the deposit, and depositing aqueous rubber containing material on the first said deposit.

10. The process of producing a variated surface effect on a rubber article which consists in drying a deposit of vulcanized rubber latex having an incorporated high percentage of zinc oxide, until a multiplicity of irregular checks or cracks occur on the deposit, and depositing aqueous rubber containing material on the first said deposit.

11. The process of producing a variated surface effect on a rubber article which consists in drying a deposit of aqueous rubber containing material having an incorporated high percentage of mineral filler, until a multiplicity of irregular checks or cracks occur on the deposit, and depositing a differently colored aqueous rubber containing material on the first said deposit.

12. The process of producing a variated surface effect on a rubber article which consists in making a deposit of aqueous rubber containing material having an incorporated high percentage of mineral filler, drying the same at temperatures above 150° F. to produce checks or cracks in a variated fashion over the surface and further depositing aqueous rubber containing material of a different color and drying.

JAMES BARRET CROCKETT.